Aug. 12, 1941.  E. W. BEEKMAN ET AL  2,252,478
GRID PASTING AND STACKING MACHINE
Filed Nov. 17, 1938    16 Sheets—Sheet 4
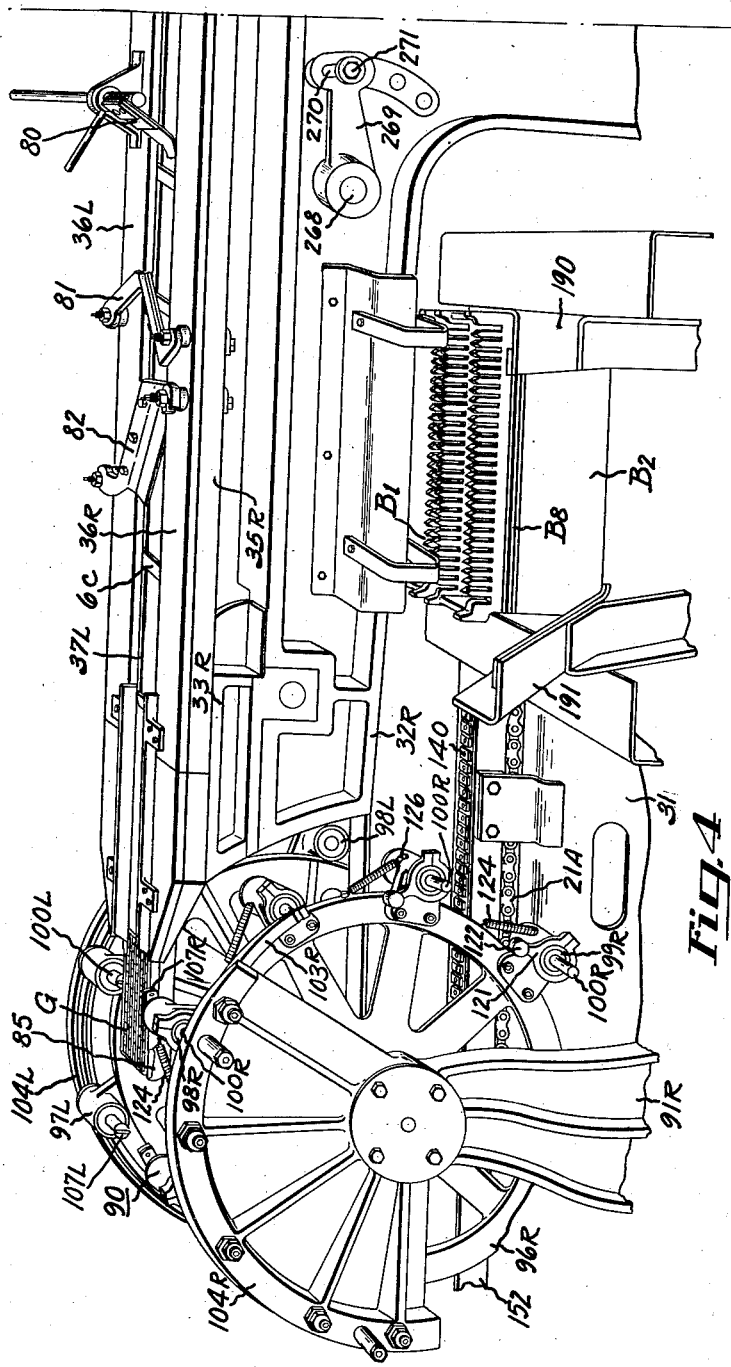
INVENTORS
Everett W. Beekman and Charles W. Jones
BY
Spencer Hardman & Fehr
their ATTORNEYS

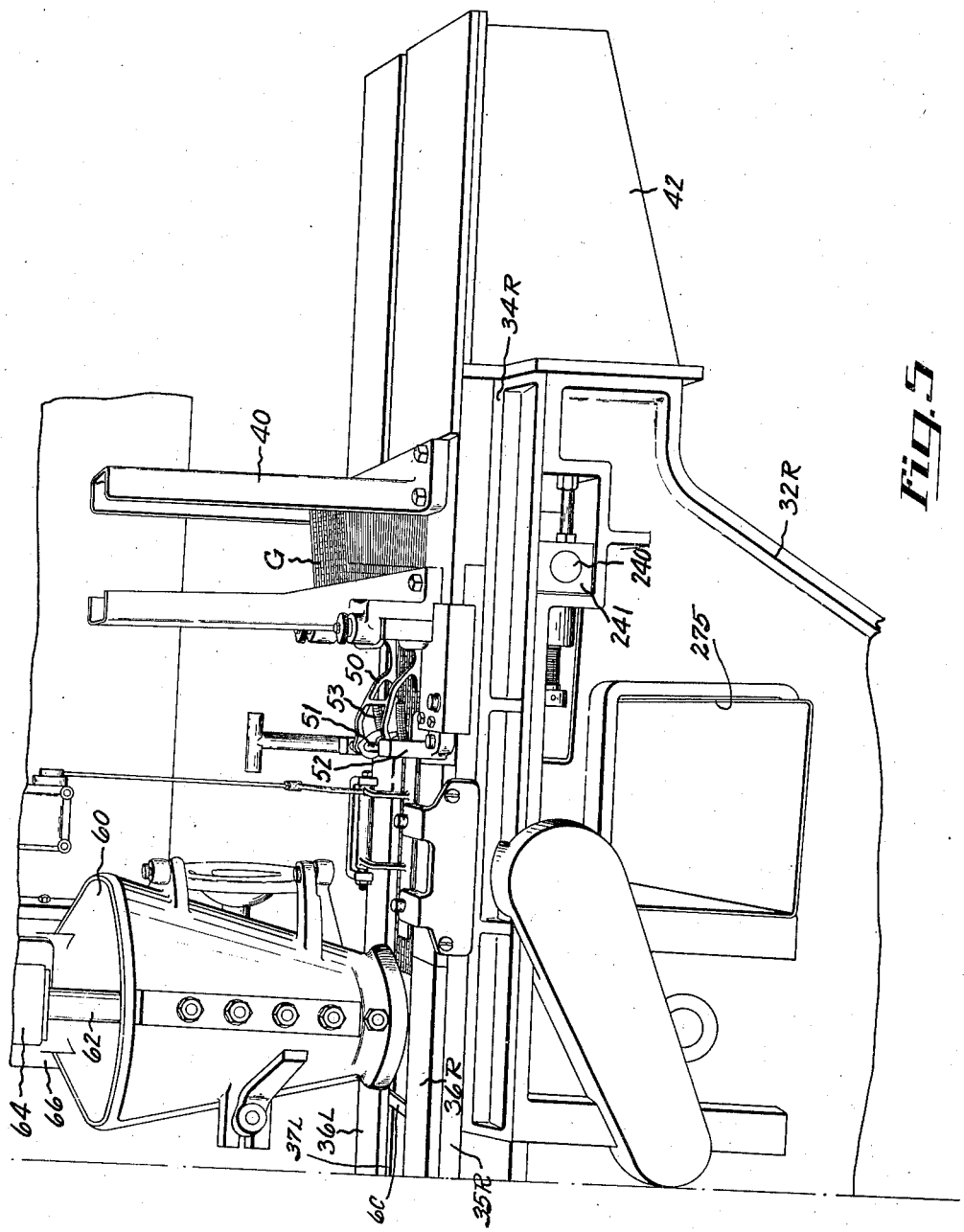

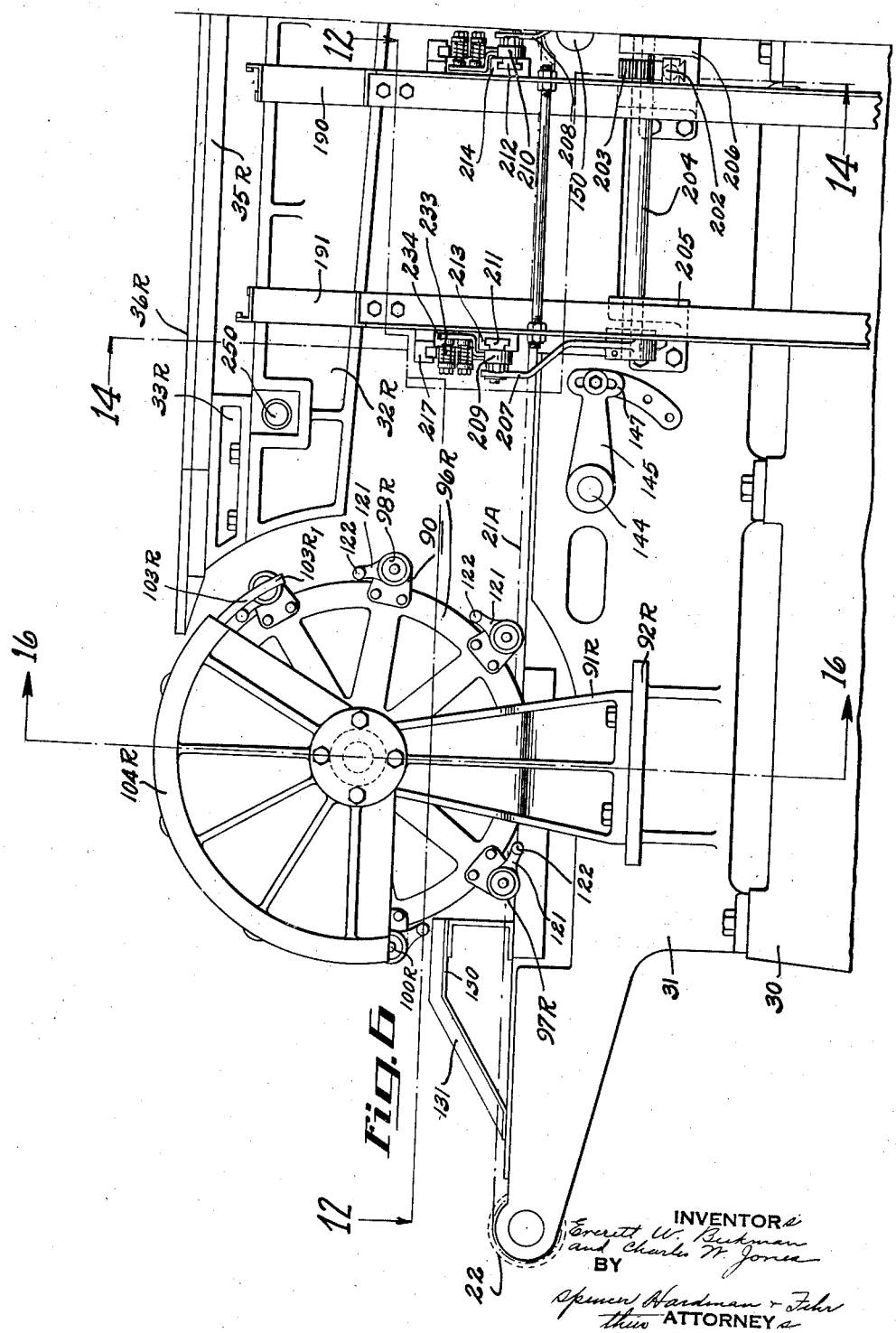

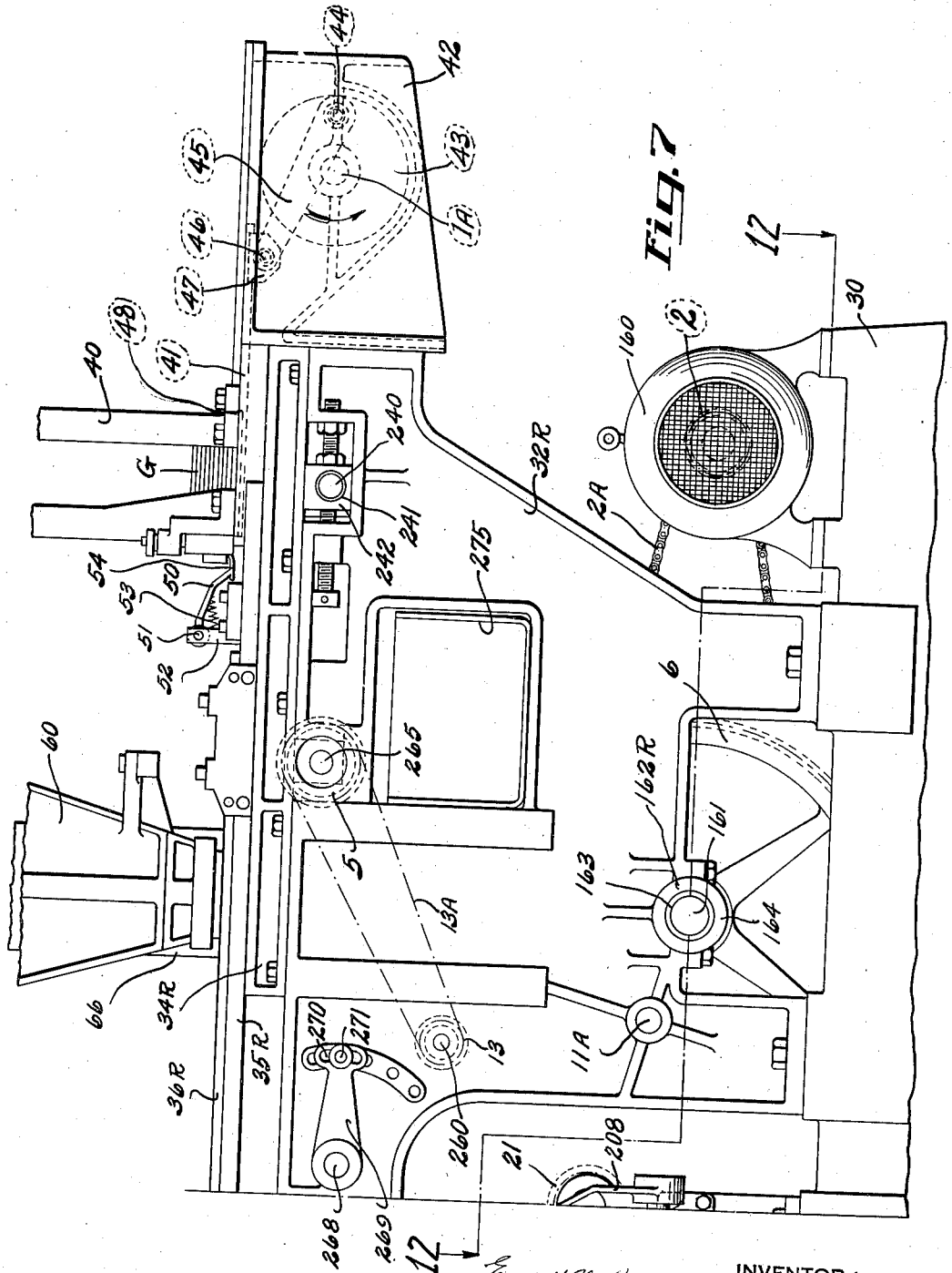

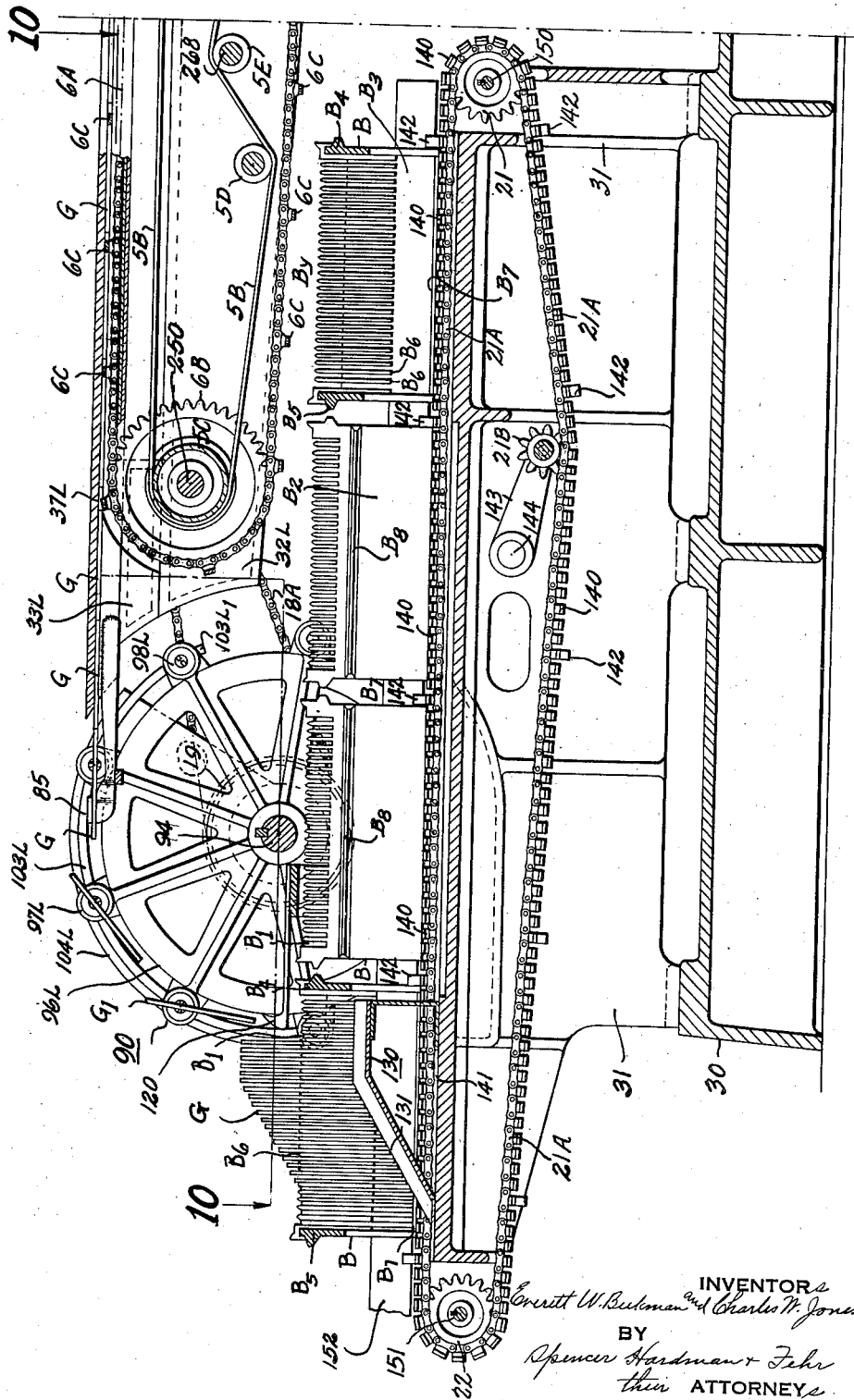

Aug. 12, 1941.  E. W. BEEKMAN ET AL  2,252,478
GRID PASTING AND STACKING MACHINE
Filed Nov. 17, 1938   16 Sheets-Sheet 9
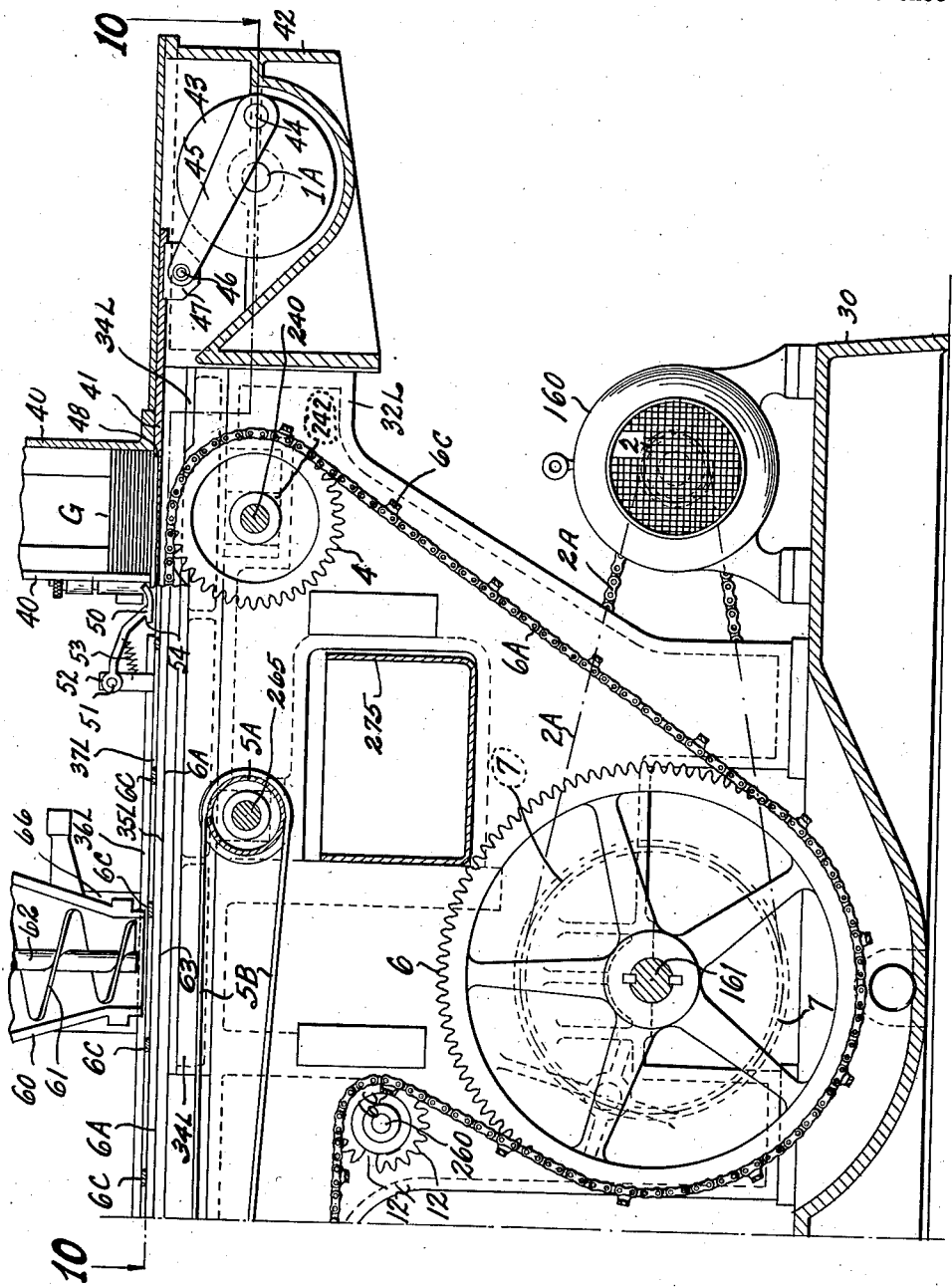
INVENTORS
Everett W. Beekman and Charles W. Jones
BY
Spencer Hardman & Fehr
their ATTORNEYS

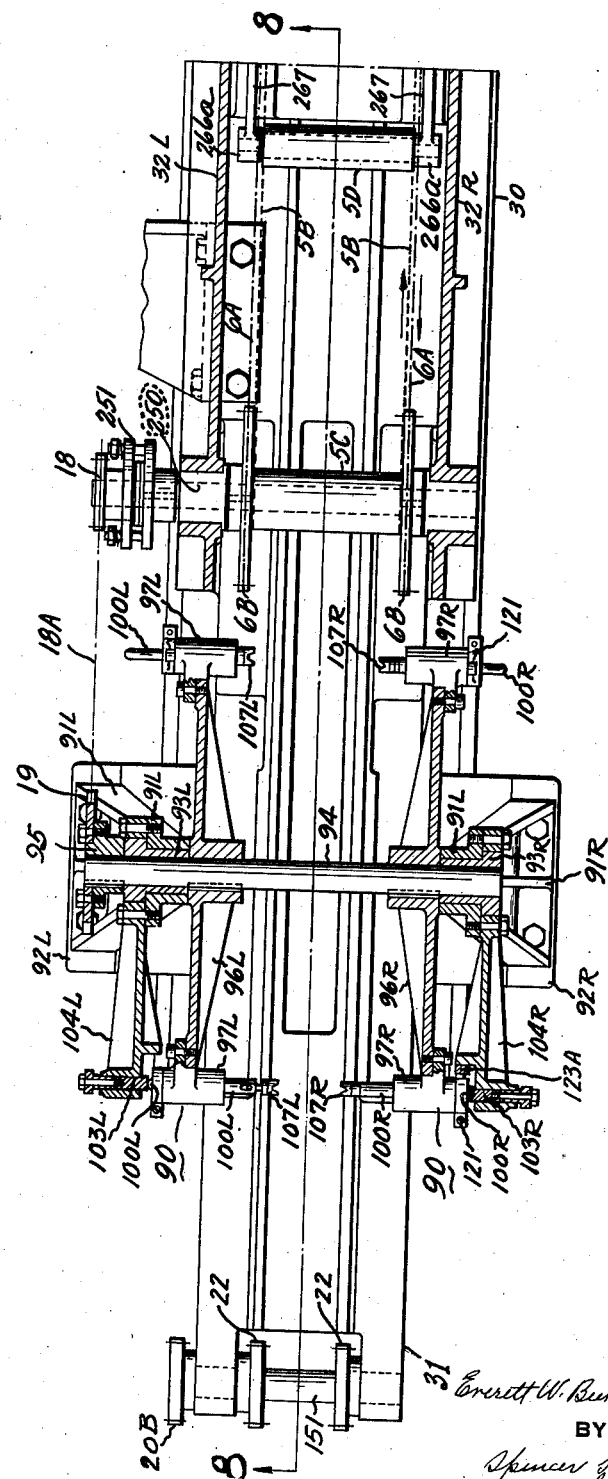

Aug. 12, 1941.  E. W. BEEKMAN ET AL  2,252,478
GRID PASTING AND STACKING MACHINE
Filed Nov. 17, 1938  16 Sheets-Sheet 11

INVENTORS
Everett W. Beekman and Charles W. Jones
BY
Spencer Hardman & Fehr
their ATTORNEYS Aug. 12, 1941.  E. W. BEEKMAN ET AL  2,252,478
GRID PASTING AND STACKING MACHINE
Filed Nov. 17, 1938  16 Sheets-Sheet 12

INVENTORS
Everett W. Beekman and Charles W. Jones
BY
Spencer Hardman & Fehr
their ATTORNEYS

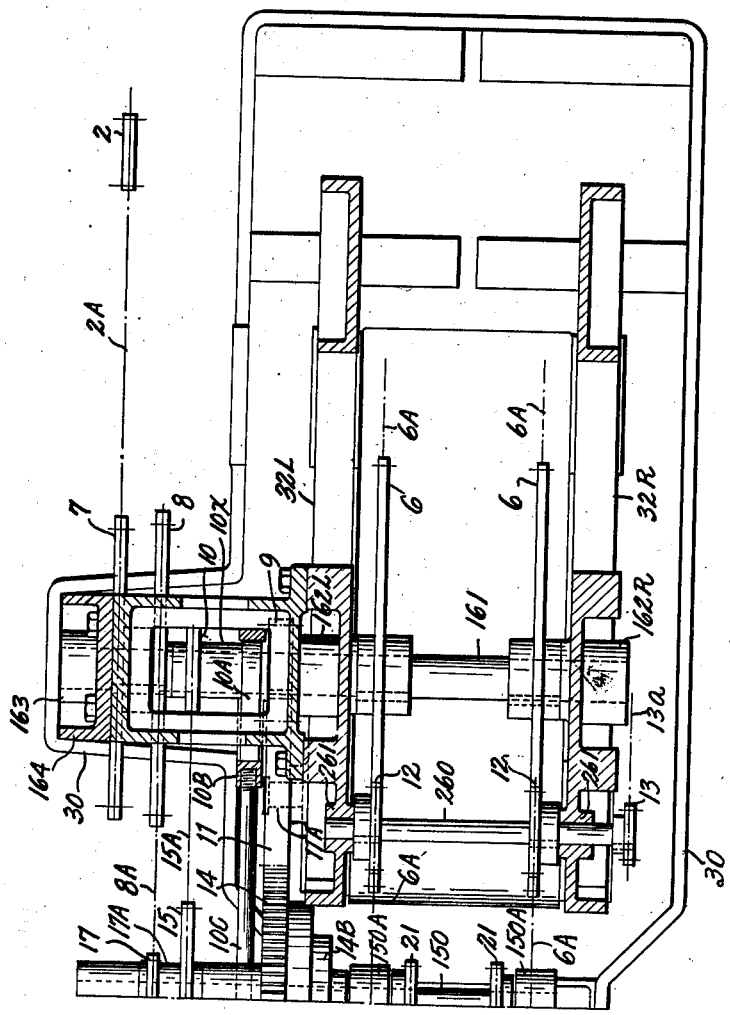

Aug. 12, 1941.  E. W. BEEKMAN ET AL  2,252,478
GRID PASTING AND STACKING MACHINE
Filed Nov. 17, 1938  16 Sheets-Sheet 14
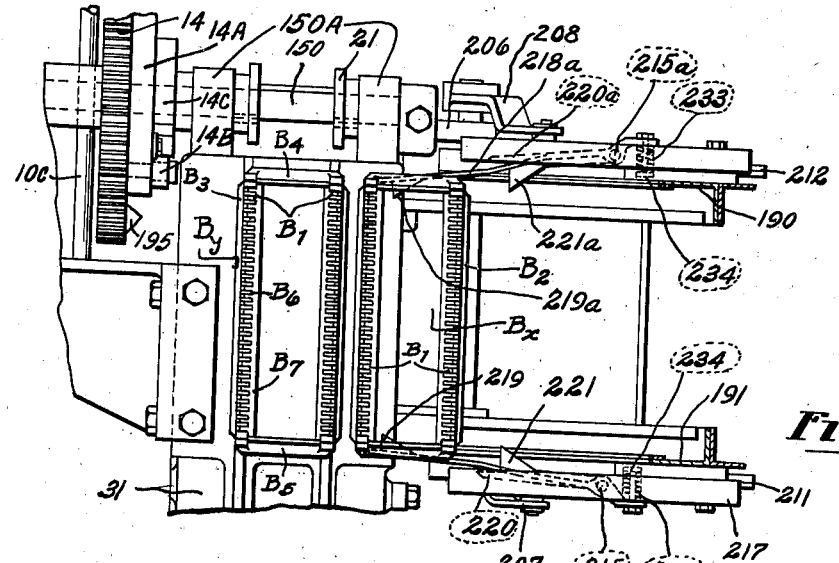
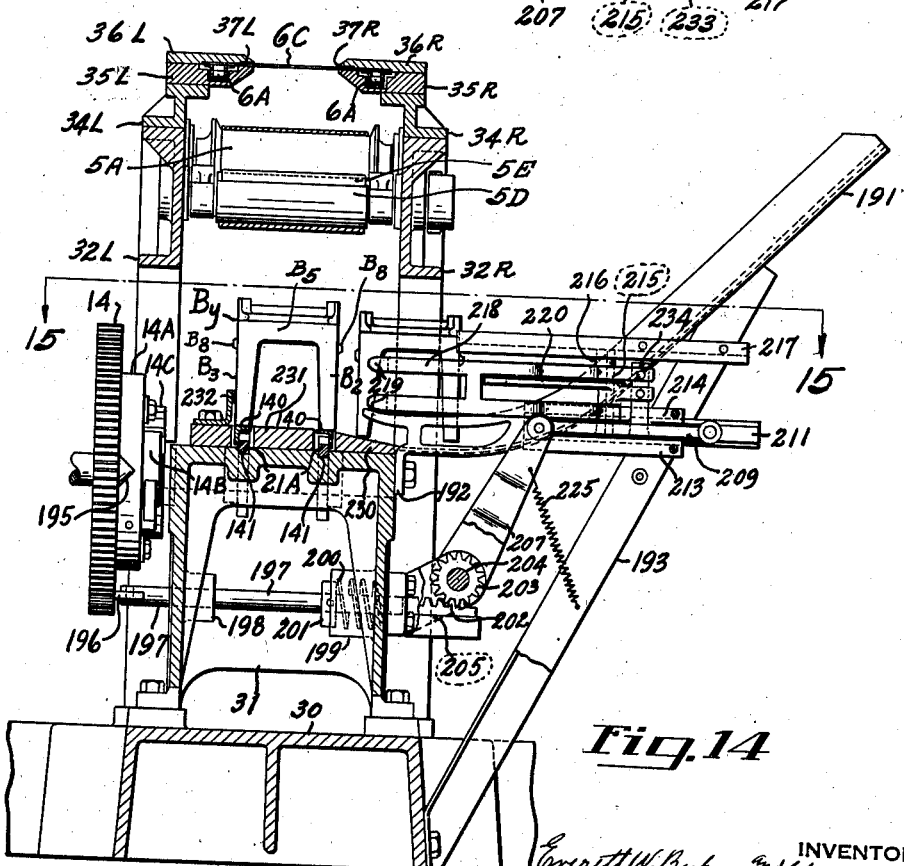
INVENTORS
Everett W. Beekman and Charles W. Jones
BY
Spencer Hardman & Fehr
their ATTORNEYS

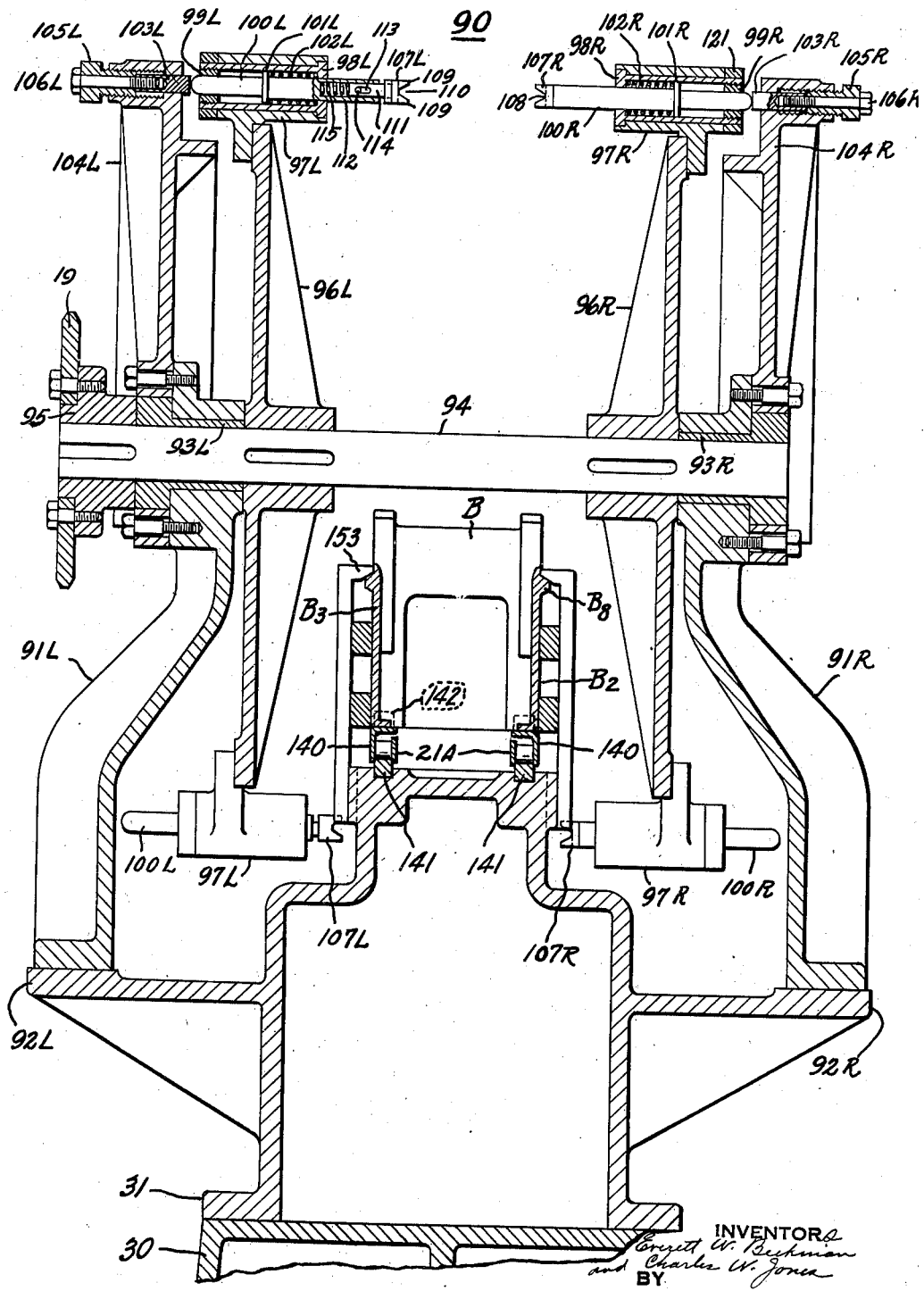

Aug. 12, 1941.  E. W. BEEKMAN ET AL  2,252,478
GRID PASTING AND STACKING MACHINE
Filed Nov. 17, 1938   16 Sheets-Sheet 16

| GEAR | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| R.P.M. | 70 | 30.92 | 17.5 | 17.5 | | 7 | 7 | 7 | 7 | 70 | | | | 2⅓ | | | 17.5 | 17.5 | 7⅑ | | |
| PITCH | ⅝ | ¾ | ⅝ | ⅝ | ⅝ | ⅝ | ¾ | ¾ | ¾ | ¾ | | ⅝ | ⅝ | ¾ | ¾ | ¾ | ¾ | ⅝ | ⅝ | ¾ | ¾ |
| TEETH | 13 | 12 | 52 | 40 | 20 | 100 | 53 | 56 | 36 | 14 | 56 | 20 | 12 | 108 | 35 | 15 | 14 | 16 | 36 | 18 | 15 |
| DIAM. | 2.612 | 2.898 | 10.351 | 7.966 | 3.995 | 19.899 | 12.661 | 13.376 | 4.500 | 3.370 | 7.000 | 3.995 | 2.415 | 13.500 | 8.367 | 3.604 | 3.370 | 3.204 | 7.171 | 4.319 | 3.604 |

INVENTORS
Everett W. Beekman and Charles W. Jones
BY
Spencer Hardman & Fehr
their ATTORNEYS Patented Aug. 12, 1941

2,252,478

UNITED STATES PATENT OFFICE 2,252,478

GRID PASTING AND STACKING MACHINE

Everett W. Beekman and Charles W. Jones, Muncie, Ind., assignors to General Motors Corporation, Detroit, Mich., a corporation of Delaware Application November 17, 1938, Serial No. 240,916

19 Claims. (Cl. 226—39.6)

This invention relates to apparatus for handling storage battery grids, and more particularly to grid handling apparatus used in conjunction with a grid pasting machine.

In the manufacture of storage batteries, particularly for automobile use, it has been the practice heretofore to paste the storage battery grids while lying in a horizontal position. Generally the grids are propelled along a horizontal table or track from a magazine and then under a hopper of paste from which the paste is forced by pressure into the interstices of the grid. The grid then passes along a track and is caused to contact with scrapers and spreaders which cause the paste to be evenly distributed upon the grid. The grids thus pasted have been assembled manually in carriers or baskets, each holding a plurality of grids, generally in upright position. These baskets filled with grids, for example, thirty to a basket, are then placed upon a carrier which carries the basket and grids through a drying oven.

It is one of the objects of the present invention to eliminate the manual labor of removing the grids one at a time from the track upon which they are pasted and the stacking of the pasted grids into the baskets. Therefore, the present invention is embodied in a grid handling mechanism which removes the grids one at a time from the track upon which they are pasted, turns each grid substantially 90° so that it will be located in a vertical position and then places the grid in a pair of suitable grooves provided by the basket. In connection with this object, it is a further object of the invention to transfer the grids from the paste track to the baskets without dropping the grids into the baskets. In order to accomplish this object, the disclosed embodiment of the invention includes an inclined plane down which the grids travel while the basket into which they have been entered travels in a horizontal direction.

A further object of the invention is to provide a basket conveyor which moves the basket by small increments, each increment being equal to the spacing of the grids when loaded upon the basket, whereby each pair of grid receiving grooves provided by the basket is located in proper position to receive a grid when supported vertically by the transfer device which transfers the grid from the pasting track to a position in alignment with a pair of grid receiving grooves of the basket. In this way the grids are successively lowered into position to be received by the basket, while the basket will have been moved through an increment of movement sufficient to bring an unoccupied pair of grid grooves into position for receiving the next grid. Thus, each basket is moved automatically by relatively slow motion until all of its pairs of grid receiving grooves are filled. Then the grid conveyor is moved automatically a greater distance through the same increment of time as before in order to move the filled basket away from the transfer device and to bring the first empty pair of grid receiving grooves of the next unloaded grid basket under the next grid to be loaded therein.

A further object of the invention is to provide for automatically feeding empty grid baskets to the grid conveyor from a magazine or inclined chute.

A still further object of the invention is to provide for the conveyance to a container of the excess paste which is removed by the spreaders and scrapers from the grids as they passed along the pasting track. A belt conveyor is provided for receiving and carrying such excess paste to a container from which the paste may be removed and returned to the pasting hopper.

Broadly speaking, it is the object of the invention to provide a grid pasting machine coordinated with a grid handling device whereby physical contact between the workman and uncured pasted grids or the waste paste of the machine is avoided with beneficial results not only with respect to the economy of manufacture of storage battery grids, but also with respect to the health of the workmen who are required to attend to the pasting of the grids. While being in the environment of storage battery grid paste which contains oxides of lead is not necessarily a hazardous occupation, it is prudent to reduce exposure of the skin to contact with lead oxides to a minimum. The present equipment makes possible the handling of grid paste and uncured pasted grids automatically without requiring direct handling by the operator.

Further objects and advantages of the present invention will be apparent from the following description, reference being had to the accompanying drawings wherein a preferred embodiment of the present invention is clearly shown.

Figs. 4 and 5, taken together, constitute a perspective front view of the apparatus.

Figs. 6 and 7, taken together, constitute a front elevation corresponding to Figs. 4 and 5.

Figure 11:
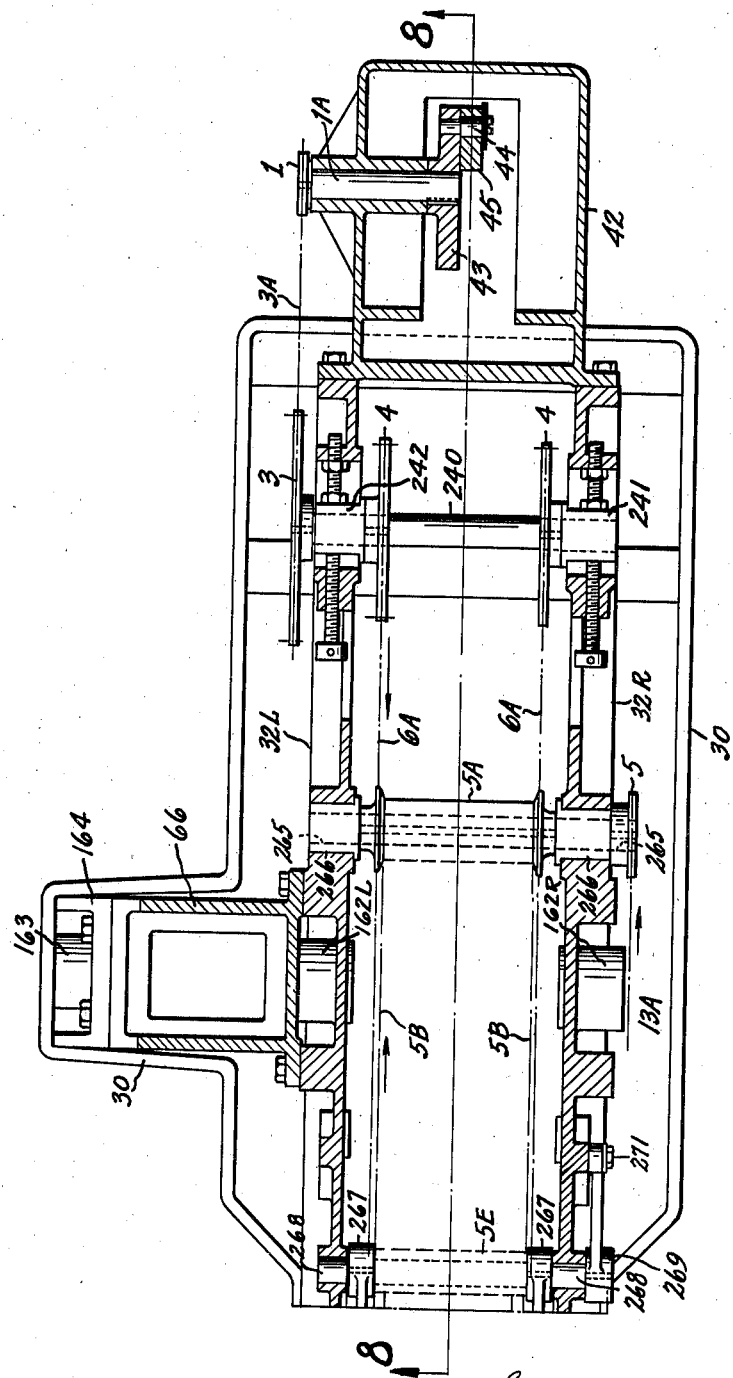
Figures 10, 17:
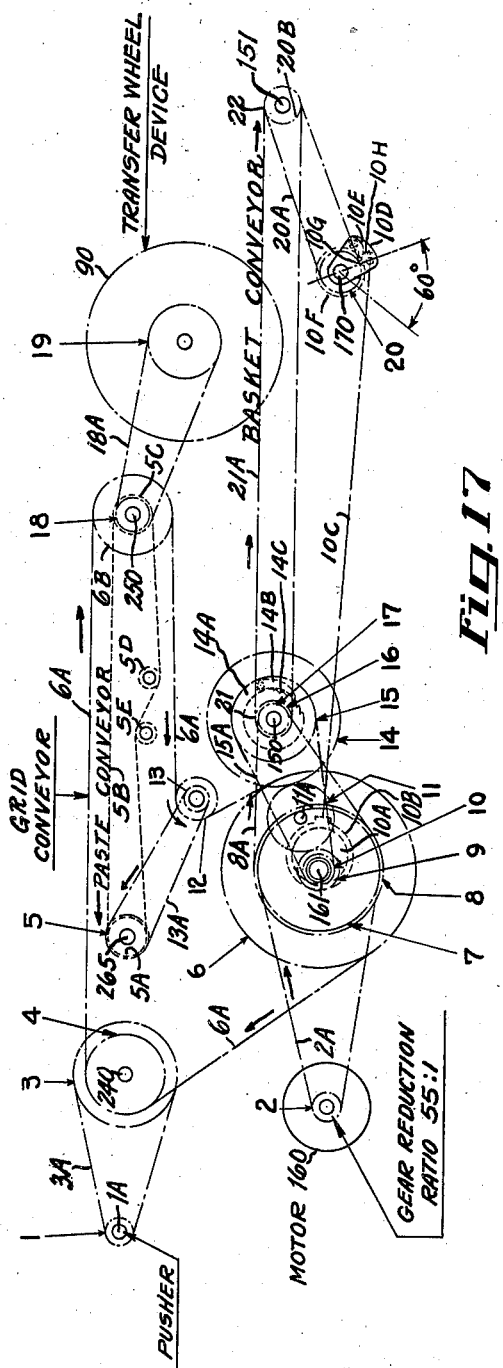

Figs. 8 and 9, taken together, constitute a longitudinal, sectional view of the machine taken in a vertical plane which would be approximately on the line 8—8 of Figs. 10 and 11.

Figs. 10 and 11, taken together constitute a sectional view taken approximately on the line 10—10 of Figs. 8 and 9.

Figure 12:
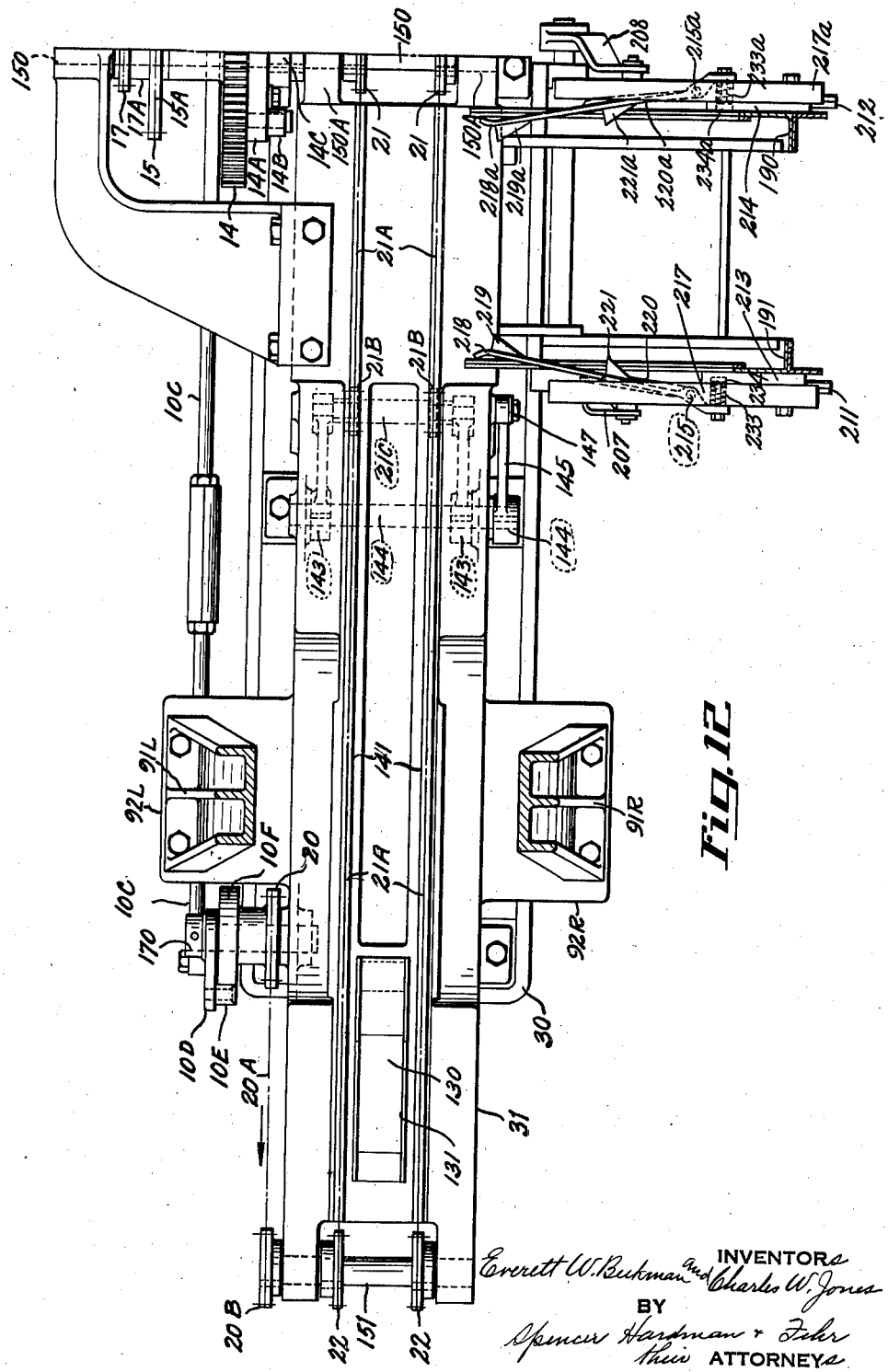

Figs. 12 and 13, taken together constitute a sectional view taken approximately on the line 12—12 of Figs. 6 and 7.

Fig. 14 is a sectional view taken approximately on the line 14—14 of Fig. 6.

Fig. 15 is a sectional view taken approximately on the line 15—15 of Fig. 14.

Fig. 16 is a sectional view on the line 16—16 of Fig. 6 and is drawn to a larger scale than Fig. 6.

Fig. 17 is a diagram of the operating mechanism of the machine.

Fig. 18 is a chart giving dimensions of various gears and sprockets represented diagrammatically in Fig. 17.

Figure 1:
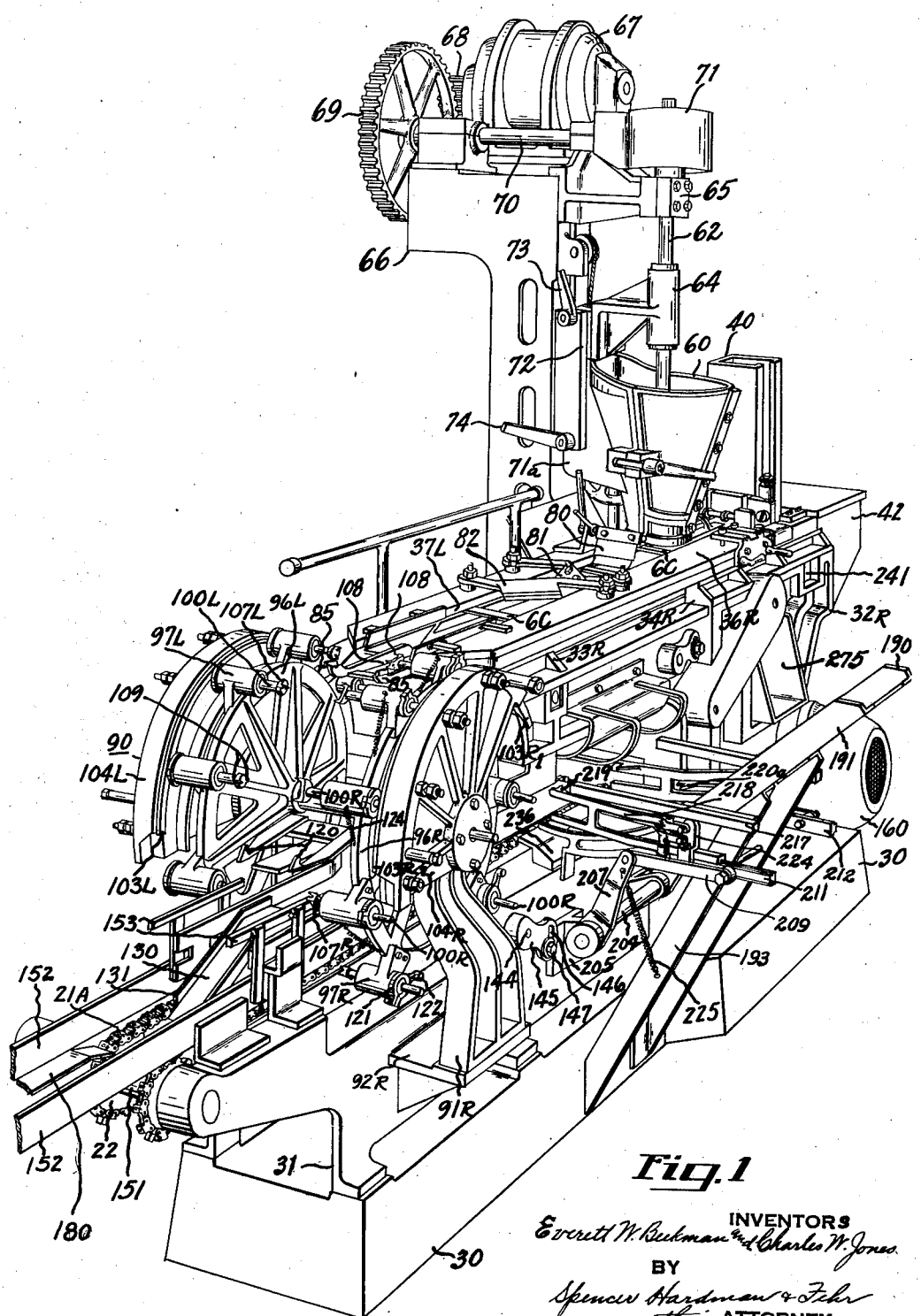
Fig. 1 is a perspective view of the grid pasting machine and grid handling equipment, this being viewed from the front and basket-loading end of the machine, the baskets being omitted for the sake of clearness.
Figure 2:
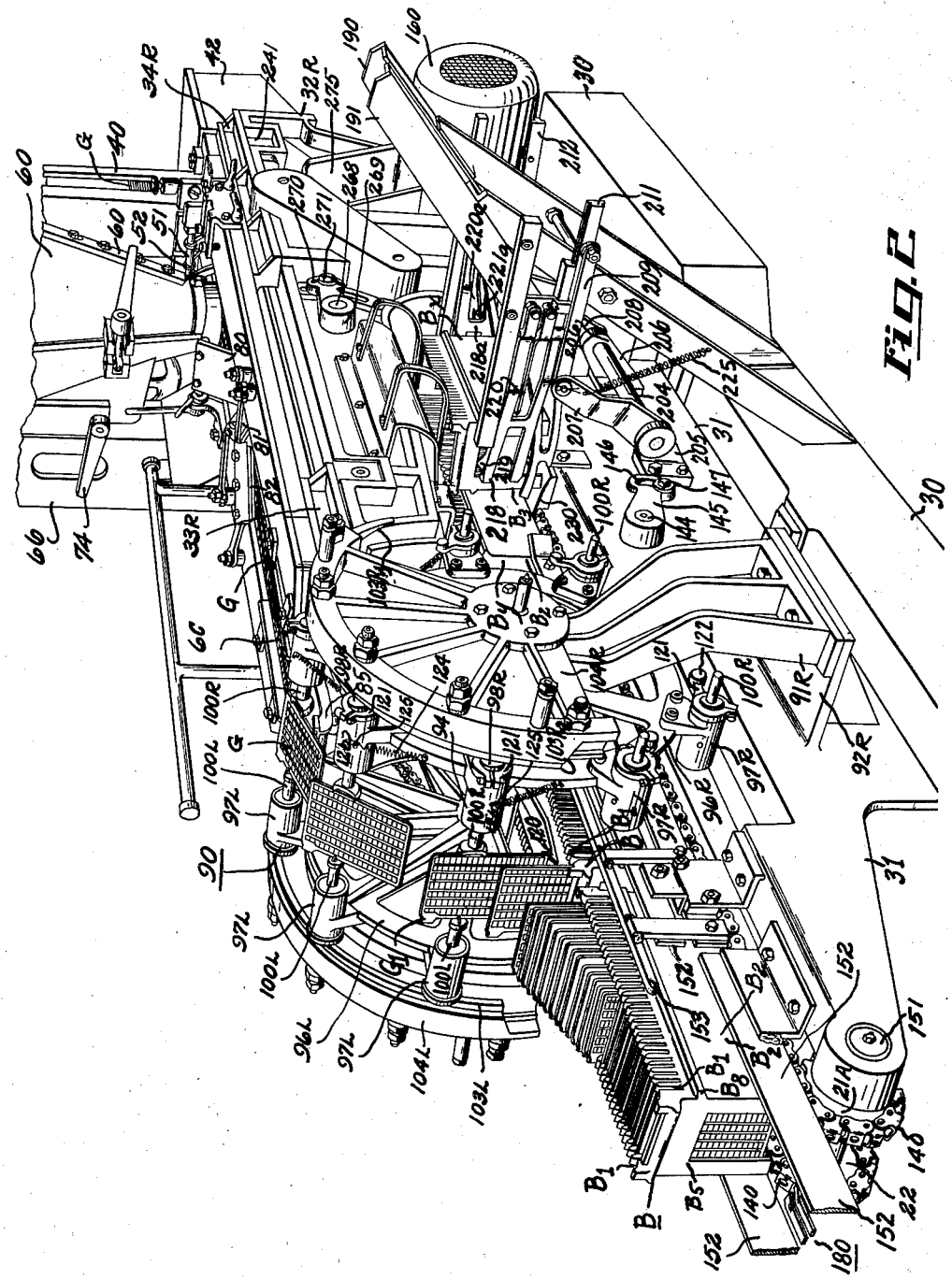
Fig. 2 is a perspective view similar to Fig. 1 but is on a slightly larger scale and shows only a fragment of the grid paste hopper. The grid baskets are shown in the process of being loaded.
Figure 3:
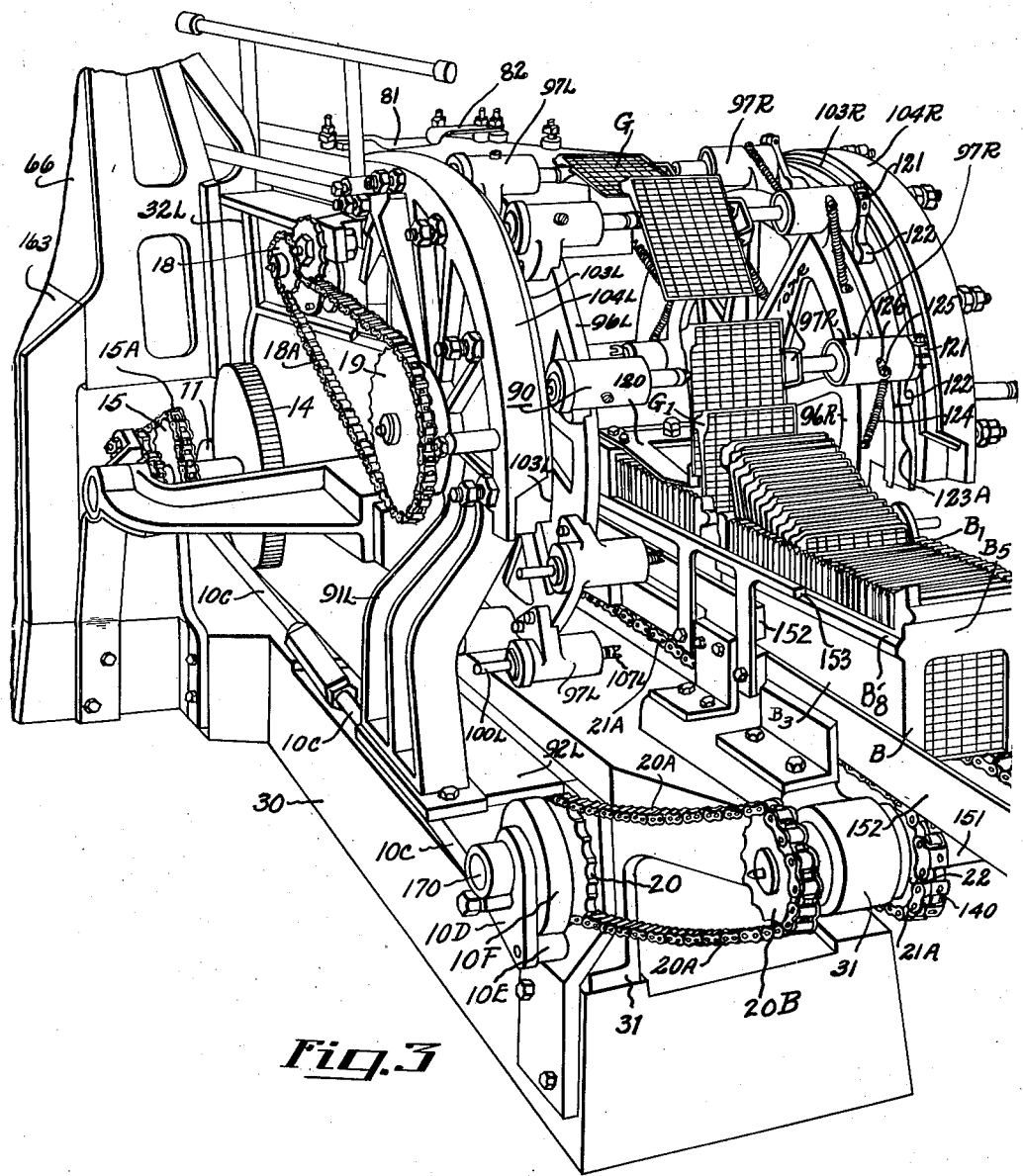
Fig. 3 is a fragmentary, perspective view viewed from the rear side of the machine and from the grid basket loading end.

Referring first to Figs. 1 and 2, the machine comprises a main base 30 supporting a grid basket conveyor base 31, a right side frame 32R and a left side frame 32L (see also Figs. 10, 11, 12 and 13). Frames 32R and L support a pair of front brackets 33R and L and a pair of rear brackets 34R and L, (see also Fig. 14). These brackets support grid conveyor rails 35R and L, which, in turn, support cover plates 36R and L. The rails 35R and L are provided with longitudinally extending grooves each for receiving one of the conveyor chains 6A of an endless chain grid conveyor. The two chains 6A are connected at regularly spaced intervals by cross bars 6C. The rail 35R and the cover plate 36R cooperate to provide a longitudinally extending groove 37R and the rail 35L and the plate 36L provide a longitudinally extending groove 37L. The grooves 37R and I receive the edge portions of the grids G (see Fig. 2) while they are being conveyed from right to left as viewed in Fig. 2. Each conveyor crossbar 6C serves to engage a grid and move it along the rails 35R and L.

The plates 36R and L support a magazine 40 which receives a stack of grids G which gravitate against a feeding pusher plate 41 mounted between rails 35R and L and guided thereby for horizontal reciprocatory movement, which is effected by a rotary shaft 1A supported by a bracket 42 attached to the side frames 32R and L. Shaft 1A drives a crank disc 43 carrying a crank pin 44 connected by a link 45 with a pin 46 carried by bracket 47 attached to the pusher plate 41. Plate 41 is provided with a shoulder 48 engageable with the right-hand edge of the lowermost grid G so that that grid will be pushed from the magazine 40 toward the left. As the lowermost grid G moves toward the left, it engages an arm 50 pivoted at 51 upon a bracket 52 and urged clockwise by a spring 53. This arm 50 urges the grid downwardly toward the conveyor chain 6A and urges the grid into engagement with the top surfaces of the rails 35R and L, which define the parts of the grid receiving grooves 37R and L. The motion of the pusher 41 toward the left is sufficient to cause the right-hand edge of the grid G to clear the stop surface 54 of the arm 50. Therefore, when the pusher bar 41 is moved toward the right away from the grid which it has deposited, the grid cannot follow the pusher bar 41 back toward the right because the right-hand edge of the grid will be engaged by the surface 54 of the arm 50.

After the grid has been placed upon the rails 35R and L in the manner described, the grid is propelled toward the left, as viewed in the drawings, by means of the bars 6C which connect the grid conveyor chains 6A. As the grids move along, they pass successively under a paste hopper 60, from the bottom of which paste is deposited under pressure by paste propeller 61 driven by a shaft 62. In alignment with the hopper is located a plate 63 which supports the grid between the rails 35R and L, while the grid is being filled with paste (see Fig. 9). Then the grids pass into contact with a spreader 80 and with scrapers 81 and 82 which remove the excess paste which drops upon a paste conveyor to be described. Paste propeller shaft 62 is supported by a vertically adjustable bracket 64 and a non-adjustable bracket 65, these brackets being supported by a pedestal 66 which rests upon the machine base 30. Pedestal 66 supports an electric motor 67 driving a pinion 68 meshing with a gear 69 driving a shaft 70 which is connected with the shaft 62 by gearing enclosed within a housing 71. With this gearing, the shaft 62 has a longitudinally-splined connection permitting the shaft 62 to be raised and lowered, while remaining in driving connection with the gearing which connects it with shaft 7. This splined connection provides for the raising and lowering of the paste hopper 60 which is attached to a bracket 71a to which the bracket 64 is also attached. The bracket 71a slides between ways 72 provided by the pedestal 66 and may be secured in the desired position of adjustment by clamping bars 73 and 74.

Referring to Fig. 8, the grids G are pushed individually by the grid conveyor bars 6C until the bars 6C leave the grid grooves 37R and L and then the grids are propelled toward the left by pushing one against the other. Finally the grids G leave the grid grooves 37R and L entirely; and, as they do so, they are each caught successively by a pair of guiding arms 85 (see Figs. 1 and 2) which locate each grid so as to be caught up by the grid transfer device 90 which causes each grid to be turned practically 90° and brought into a position where the grid is entered into a pair of grid receiving notches B1 of a grid basket B, as shown in Fig. 2.

Referring to Figs. 1, 2, 3 and 16, the grid transfer device 90 comprises bracket 91R and L supported on shelves 92R and L integral with grid basket conveyor frame 31. Brackets 91R and L support respectively bearings 93R and L for a shaft 94 which is driven through a sprocket gear 19 attached to a hub 95 which is carried on the shaft 94. Shaft 94 drives transfer wheels 96R and L which together support nine pairs of plunger brackets 97R and L, in turn supporting bushings 98R and L, which are closed by screw plugs 99R and L. These bushings and plugs provide, respectively, for the support of plungers 100R and L which are guided for horizontal sliding movement. Plungers 100R and L are provided, respectively, with shoulders 101R and L against which springs 102R and L, respectively, bear. The right-hand plunger 100R is, therefore, urged toward the right against a segmental cam plate 103R supported by a cam plate bracket 104R attached to the bracket 91R. The cam plate 103R can be adjusted in a horizontal direction parallel to the axis of shaft 94 by means of bushing 105R threaded into the bracket 104R and bearing against the right-hand edge of the segmental cam plate 103R. The plate 103R can be clamped against the threaded bushing 105R by a bolt 106R. When the bolt 106R is tightened, the rotation of the bushing 105R is prevented. Similarly, the plunger 100L bears against a segmental cam plate 103L supported by a cam plate bracket 104L attached to the bracket 91L. Plate 103L can be adjusted in a horizontal direction parallel to the axis of the shaft 94 by means of a bushing 105L threaded into the bracket 104L and secured in the desired position by means of a bolt 106L which extends through the bushing 105L and is threaded into the cam plate 103L. The plunger 100R is provided with a plunger tip 107R having notched bosses 108 which are located on diametrically opposite sides of the axis of plunger 100R. The plunger 100L is provided with a separate plunger tip 107L which carries projections 109 located on diametrically opposite sides of the axis of the plunger 100L. The projections 109 define a notch 110 which is in substantial alignment with the symmetrical axis of notches of the two notched bosses 108 of the plunger tip 107R. The plunger tip 107L is provided with a shank 111 which has a sliding fit with the plunger extension 112 of the plunger 110L. The shank 111 is provided with a slot 113 which receives a pin 114 carried by the plunger extension 112. A spring 115 tends to urge the plunger tip 107L toward the right-hand plunger tip 107R.

Fig. 16 shows the plunger tips 107R and L in position for gripping a grid. Before these tips are in grid gripping position, their respective plungers 100R and L are located out of contact with the cams 103R and L, as will be apparent in Fig. 2 for example, where the right-hand ends of the plunger 100R are clearly shown. The transfer wheels 96R and L rotate counterclockwise as viewed in Fig. 2, thereby causing plungers 100R and L to be brought into contact successively with the inclined entering surfaces 103R₁ and 103L₁, respectively, of the cams 103R and L. Surface 103R₁ is shown in Figs. 1 and 2, and surface 103L₁ is shown in Fig. 8. In this way the cams 103R and L operate to move the plungers 100R and L toward the grid. The cams 103R and L are so shaped as to cause the plunger tips 107R and L to pick up a grid just as it is located upon the guiding fingers 85 (see Figs. 2 and 8). The grids remain gripped by the pairs of plunger tips, as shown in Fig. 2, during approximately 90° of movement of the transfer wheels 96R and L, which movement will cause each grid to be moved into a substantially vertical position, as shown in Fig. 2. The grid is not then released by the gripping plunger tips, but these tips are caused to be rotated relative to their supporting brackets 101R and L in such a manner that, while the transfer wheels are rotated, the grids will be lowered in a substantially vertical direction and will be guided into the grid receiving grooves B₁ of basket B before the gripping tips 107R and L are relased from the grid. Fig. 2 shows a grid marked G₁ which has been carried by the grippers 107R and L into position wherein the lower edge of the grid starts to engage with guiding fingers 120. As the transfer wheels 96R and L continue to rotate counter-clockwise, the plungers 100R and L, when in this position, begin to rotate clockwise in order that the grid may be moved substantially vertically downwardly, although the plungers are moved in the arc of a circle. This vertical movement is effected by producing rotation of at least one of the bushings 98R and L. In the disclosed embodiment the bushing 98R, shown in Fig. 16, is fixed to a clamp arm 121, the end 122 of which (see Fig. 3) is engageable with the lobe 123A of a stationary cam. The follower 122 is urged against the cam lobe 123A by a spring 124 having one end attached to the wheel 96R and the other end attached to a screw pin 125 extending through a slot 126 in the bracket 97R and screwed into the bushing 98R. By the time the grid shown at G₁ in Fig. 2 has been entered into the pair of grid receiving grooves B₁ of basket B immediately below the grid G₁, the plungers 110R and L will have arrived at the ends of the cams 103R and L. The end of cam 103R is indicated at 103R₂ in Fig. 2.

As shown in Figs. 8, 14 and 16, the grid basket B comprises side plate members B₂ and B₃ joined by integral cross members B₄ and B₅. The plates B₂ and B₃ are provided with oppositely located pairs of parallel ribs B₆ so spaced as to provide pairs of grid receiving grooves B₁ which include the notches B₁ provided at the upper edges of the plates B₂ and B₃ to provide for the reception of the grid tangs. The lower edges of the plates B₂ and B₃ are provided with inwardly extending flanges B₇ upon which the lower edges of the grids rest. At the time a grid is released by the transfer device 90 it will have been entered substantially into a pair of grid receiving grooves B₁ but the grid is not allowed to drop immediately upon the flanges B₇ of the plates B₂ and B₃ because the grid would receive a severe shock sufficient to jar the grid paste loose. Therefore, there is provided an inclined structure or ramp 130 which is straddled by the grid basket B as it moves along from right to left by a conveying mechanism to be described. Upon reference to Figs. 2, 3 and 8, it will be seen that as the grids are being carried along toward the left by the baskets, the grids must follow the grid engaging flanges 131 provided by the ramp 130. Therefore, the grids gradually descend to the bottom of the basket where they finally rest upon the flanges B₇ thereof. Therefore, the grids are handled in a manner which prevents them from receiving a shock such as would jar the grid paste loose.

The grid baskets B are conveyed toward the left in Figs. 2 and 8 by grid conveying mechanism which will now be described. The grid conveyor comprises a pair of conveyor chains 21A to the links of which are attached angle plates 140 shown in Figs. 8 and 14. The plates 140 support the baskets B and those portions of chains 21A which are supporting baskets B are supported on track surfaces 141 inserted in the grid conveyor frame 31. As shown in Fig. 8, the chains 21A are provided at regularly spaced intervals with lugs 142 which engage the baskets B. The chains 21A pass around pairs of driving sprockets 21, pairs of normally idle sprockets 22 and pairs of slack take-up sprockets 21B pivotally supported by arms 143 attached to a rod 144 which, as shown in Fig. 2, carries an arm 145 provided with an arcuate slot 146 through which passes a bolt 147 threaded into the frame 31. In this way the arm 145 can be clamped into the desired position of adjustment and the take-up sprockets 21B located in the position required for taking up slack in the chains 21A. Sprockets 21, which are normally the driving sprockets, are fixed to a shaft 150 which is driven at a constant rate of speed and a speed such that the baskets B will be moved the distance between adjacent pairs of grid grooves B₁, while the transfer wheels 96R and L move ⅑ revolution. As each basket B has a capacity of thirty grids, it is apparent that means must be provided for shifting the basket after it has been filled to a distance sufficient to bring the first adjacent pair of empty grid grooves B₁ into alignment with a descending grid all during the next succeeding ⅑ revolution of the grid transfer wheels 96R and L. To accomplish this extra movement (which is preferably six times the distance between adjacent grid grooves B₁), there is provided a mechanism which is effective immediately following the filling of a grid basket with thirty grids to effect this extra movement of the basket conveyor 21A. The mechanism which effects this additional movement operates through the shaft 151 which carries the sprockets 22. This mechanism will be described later. As the baskets move along, lateral shifting movement thereof is prevented by plates 152 (see Figs. 2 and 3) which engage the side walls of the baskets. Any accidental upward movement of the grid baskets B is prevented by stationary bars 153 which are engageable with the horizontally extending flanges B₃ provided by the side walls of the baskets.

The mechanism for operating the grid handling devices will now be described with particular reference to Figs. 17 and 18 as well as other figures. An electric motor 160 (see Fig. 9) which is supported upon the base 30, drives a pulley or sprocket gear 2 through a gear reduction. While the particular speed of operation of the mechanism is immaterial, it may be noted that satisfactory operation is effected with the use of an electric motor which operates at approximately 1700 R. P. M. armature shaft speed. The armature shaft of the motor is geared to the sprocket wheel 2 through a 55 to 1 gear reduction, causing the gear 2 to rotate approximately 30.92 R. P. M. as indicated by Fig. 18. Sprocket 2 drives sprocket 7 through sprocket chain 2A. The ratio of this drive is 12 to 53, as indicated by Fig. 18. Therefore, the speed of rotation of the gear 7 is substantially 7 R. P. M. Gear 7 is fixed to a shaft 161 (see Figs. 9 and 13) which supports and is drivingly connected with sprocket gears 6 and 8. The shaft 161 is journalled in bearings 162R and L, carried by side frames 32R and L respectively, and is also journalled in a bearing 163 carried by bracket 164 supported by the machine base 30. Shaft 161 supports and drives a gear 9 meshing with an idle gear 11 journalled on a stub shaft 11A carried by the side frame 32L. Idle gear 11 drives gear 14 which is mounted upon and which drives the shaft 150, shown in Figs. 8, 12 and 13. The shaft 150 is supported in bearing brackets 150A provided by the gear bracket conveyor frame 31. The ratio of gearing of the train of gears 9, 11 and 14 is such that the gear 14 is rotated at 2⅓ R. P. M. at which speed the gears 21 which normally drive the grid basket conveyor chains 21A will be rotated. Gear 14 is drivingly connected with the shaft 150 through a one-way driving connection which comprises a pawl 14B pivotally supported on a plate 14A drivingly connected with the gear 14. Pawl 14B cooperates with a 32 tooth ratchet wheel 14C, which is drivingly connected with the shaft 150.

In this way the gear 14 is provided with a one-way drive to the shaft 150, but the shaft 150 may be rotated by other means at a rate faster than it could be driven by the gear 14.

Shaft 161 drives sprocket gear 8 connected by sprocket chain 8A with a small gear 17 which is journalled on the shaft 150, but is not driven thereby. The gear 17 drives through a hub 17A the sprocket gear 15, also loose on the shaft 150. Gear 15 drives through a sprocket chain 15A a small gear 10 which is journalled on the shaft 161 but is not driven thereby. Gear 10 is connected through a sleeve 10X with an eccentric 10A. The ratio of the gear train including gears 8, 17, 15 and 10 is such that the eccentric 10A will be rotated at the rate of 70 R. P. M. The eccentric 10A cooperates with an eccentric strap 10B which is connected by an eccentric rod 10C connected with a lever 10D carrying pawl 10E which cooperates with a disc 10F (see also Fig. 12). Disc 10F is provided with a single notch 10G for receiving the pawl so that the pawl 10E may drive the disc 10F only once during a revolution of the disc 10F. The lever 10D is journalled on a stud shaft 170 attached to basket conveyor base 31. Shaft 170 provides a bearing for the disc 10F which drives sprocket gear 20 connected by a sprocket chain 20A with sprocket 20B which is fixed to shaft 151, which supports sprockets 22. Sprockets 20B, 21 and 22 each have 15 teeth. When these sprockets make one revolution, the basket conveying chain 21A will have been moved during a distance sufficient to bring all 30 of the pairs of grid receiving grooves B₁ of each basket B into grid receiving relation with the transfer device 90. The gear 20 has 18 teeth while the gear 20B has 15 teeth. Therefore, when the gears 22 have made one revolution, the gear 20 will have made 15/18 or ⅚ of a revolution. At the end of this ⅚ revolution, the notch 10G of disc 10F will have been brought into alignment with the free end of pawl 10E, whereupon the pawl 10E will be urged into the notch 10G by a suitable spring 10H. Then during the following oscillation of the eccentric rod 10C toward the left in Fig. 17, the plate 10D will be rotated 60° or ⅙ of a revolution, thereby carrying the disc 10F and the gear 20 through the remaining ⅙ revolution. The remaining ⅙ revolution takes place during the same period of time required for ⅑ of a revolution of the transfer wheels 96R and L or the time required for that increment of movement of the chain 21A a distance equal to the spacing between adjacent pairs of grid receiving grooves B₁ of the basket B. The 60° movement of the gear 20 causes a 72° movement of the gear 22 since the ratio is 18 to 15 or 6 to 5. Therefore, the gear 22 is momentarily driven by gear 20 at a speed 6 times as fast as it is normally driven by the gear 21 and conveyor chains 21A (normal speed is 1/30 of a revolution, or 12° between consecutive grid loadings onto a basket). Therefore, the chains 21A are driven by gear 20 at a speed faster than they can be driven by the shaft 150 and pawl 14b. The 30 tooth ratchet 14C simply moves ahead of the pawl 14b by spacing equivalent to 6 ratchet teeth. The baskets are driven, therefore, ahead 6 grid groove spaces B₁ which is a distance sufficient to move the filled basket out of the way and to bring the first pair of grid receiving grooves B₁ of the next basket to be filled into alignment with a grid which is being vertically lowered by the transfer device 90. Then the mechanism continues to operate in the normal way until this next basket has received 30 grids. By that time the disc 10F will have been rotated 5/6 of a revolution to bring the notch 10G again into alignment with the pawl 10E, whereupon the eccentric rod 10C will be effective to drive the disc 10F and the gear 20 one-sixth revolution for the purpose of obtaining a quick movement of the baskets for the purpose specified.

From the foregoing, it is apparent that the operation of stacking pasted grids in the grid baskets is performed automatically and that the machine is not stopped when a basket is filled, but the baskets are moved ahead sufficiently to get the filled basket out of the way and to present an unfilled basket to the mechanism which transfers the pasted grids from the grid conveyor to the basket conveyor. The filled grids are pushed along a chute or guide-way 180, a fragment of which is shown in Fig. 2. This guide-way 180 may direct the filled baskets to another conveyor which conveys them to the drying oven, not shown.

After the pasted grids pass through the drying oven, they are removed from the baskets and the empty baskets are returned to the paste machine. A number of these empty baskets are placed upon an inclined chute which comprises bent angle members 190 and 191 (see Figs. 2, 12, and 14) which guide the baskets from an inclined position to a vertical position such as shown in Fig. 2, where the basket at the bottom of the chute is indicated by reference $B_x$. The basket descends in the position $B_x$ due to the weight of the baskets which are further up along the chute, these other baskets being omitted for the sake of clearness. From the position $B_x$, the baskets are moved automatically to the position $B_y$, shown in Fig. 14, in which position the basket is located upon the lugs 140 of the basket conveyor chain 21A. This movement is effected once during each revolution of gear 14 which turns once for each cycle of filling of a basket and movement of a filled basket out of range of the transfer 90 and the movement of an unfilled basket into range thereof. Accordingly, the gear 14 is provided with a cam lobe 195 which engages a follower roller 196 carried by a rod 197 horizontally slidable through bearings 198 and 199 carried by the basket conveyor frame 31, as shown in Fig. 14. The follower 196 is urged against the right-hand face of the gear 14 and into contact with the cam lobe 195 by a spring 200 bearing the one end against a frame 31 and at the other end against the collar 201 pinned to the rod 197. Rod 197 carries a rack 202 meshing with a gear 203 fixed to a shaft 204 journalled in brackets 205 and 206 fixed to the frame 31. Shaft 204 carries arms 207 and 208 connected respectively with racks 209 and 210 connected respectively with slides 211 and 212. Slide 211 is guided for horizontal reciprocatory movement by ways 213 and 214 and carries a vertically extending rod 215 which extends into a bearing plug 216, which slides in a way provided by a bar 217. The rod 215 provides a bearing for a bifurcated pawl 218, each arm of which carries a lug 219. The rod 215 also is provided with a pivoted support for a pawl 220 bearing a lug 221. In a similar manner, the other slide 212 is guided for reciprocatory movement and provides a pivot 215a for a similar pawl 218a carrying lugs 219a and a similar pawl 220a carrying a lug 221a. When a basket is located at $B_x$ in Fig. 2, its leg $B_3$ is in position to be engaged by the lugs 219a of the basket loading mechanism and the corresponding leg $B_3$ of the next basket in the chute next to the basket at $B_x$ is located so as to be engaged by the lugs 221 and 221a of the basket loading mechanism. Therefore, a movement of rod 197 toward the right from its position shown in Fig. 14 due to engagement of the cam 195 with follower 196 to cause the levers 207 and 208 to move the pusher bars 211 and 212 toward the left, carrying with them the pawls 218 and 218a and 220 and 220a, thereby causing the lugs 219 and 219a to engage the lugs or sides $B_3$ of the basket at $B_x$ to push the same into the position shown at $B_y$ in Fig. 14 and to cause the next basket in the chute to be engaged by the lugs 221 and 221a and to push that basket to the position shown at $B_x$. During movement of the basket from $B_x$ to $B_y$ its legs or sides $B_3$ and $B_2$ slide up along an inclined block 230 and then across the right-hand chain 21A and then across a horizontal block 231 and then onto the left-hand chain 21A, movement of the basket being limited by engagement with a stop bracket 232. Obviously, the right-hand leg or side $B_2$ slides along the incline 230 and finally rests upon the lugs 140 of the right-hand conveyor chain 21A. The pairs of pawls 218, 218a, 221 and 221a are urged toward each other by light springs 233 which are confined between the ends of the pawls and posts 234 supported by the slide 211. Therefore, during movement of the rod 197 toward the left and levers 207 and 208 toward the right, or clockwise, the pawl lugs 219, 219a and 221 and 221a ride over the end faces of baskets causing the respective pairs of pawls to be separated from each other and then to return to normal position when the pawls 219 and 219a have been located to the right of the legs $B_3$ of the basket when located in the position $B_x$ shown in Fig. 2 at the same time the pair of pawls 221 and 221a will be located at the right of leg $B_3$ of that basket which follows the basket shown in $B_x$. In this way the baskets which have been placed upon the chute bars 190 and 191 gravitate toward the bottom of the chute and are picked up by the mechanism which will automatically feed them one at a time to the grid basket conveyor chain 21A. Return of the shaft 197 to normal position and return of the pawls 218 and 218a and 220 and 220a to normal position is assisted by a spring 225 connecting the arm 207 with the chute brace 193.

The grid conveyor chains 6A are driven by the gear 6 fixed to the shaft 161. The two chains 6A pass around sprocket 4 fixed to a shaft 240 journalled in bearing blocks 241 and 242 supported by the side frames 32R and L respectively, shaft 240 carrying a sprocket gear 3 which drives the sprocket gear 1 through the sprocket chain 3A. Gear 1 drives the shaft 1A which operates the grid pusher mechanism which feeds the grids one at a time from the magazine as has been explained. The ratio of gearing between the train of gears 6, 4, 3 and 1 is 10 to 1, hence the pusher shaft 1A rotates at 70 R. P. M.

The conveyor chains 6A also pass around sprocket wheels 6B which are fixed to a shaft 250 which is connected through a friction clutch 251 with a sprocket gear 18 connected by sprocket chain 18A with the gear 19 which drives the transfer wheels 96R and L. The gear ratio of the train of gears 6B, 18 and 19 is such that the transfer wheels rotate at 7 7/9 R. P. M. Since there are 9 transfer arms, the transfer mechanism 90 is capable of receiving 9 times 7 7/9, or 70 grids per minute, which is equivalent to the capacity of the grid delivering magazine operated by the shaft 1A. Incidentally, the eccentric rod 10C is making 70 reciprocations per minute so that there is one reciprocation for every grid delivered from the magazine to the conveyor chain 6A and for every grid transferred from the conveyor chain 6A to a basket on the basket conveyor chains 21A.

The grid conveyor chains 6A pass around sprockets 12 which are notched at 12X to accommodate the grid pusher bars 6C. Sprockets 12 are fixed to a shaft 260 (see Fig. 9) journalled in bearings 261 provided by the side frames 32R and L. Shaft 260 supports and drives a sprocket gear 13 connected by a chain 13A with sprocket gear 5 (see Fig. 7). Gear 5 is fixed to a shaft 265 journalled in bearings 266 provided by the side frames 32R and L. Shaft 265 carries a belt roller 5A around which passes a belt 5B (see Figs. 11 and 17). Belt 5B passes also around a roller 5C (see Fig. 10) loosely supported on shaft 250. Belt 5B passes in contact with rollers 5D and 5E, shown diagrammatically in Fig. 17. Roller 5D is adjustable in order to take up the slack. For this purpose roller 5D is rotatable on bearings 266a provided by arms 267 which are fixed to a shaft 268 which supports the roller 5E (see Figs. 10 and 11). Shaft 268 carries an arm 269 provided with an arcuate slot 270 through which passes a bolt 271 by which the arm 269 may be fixed to the side frame 32R in the desired position of adjustment. The grid chain 6A moves so that the gears 12 and 13 are rotated counter-clockwise, as viewed in Fig. 17, or clockwise, as viewed in Fig. 9. Therefore, the belt 5B moves from right to left in Fig. 17, or from left to right in Fig. 9. Belt 5B is located beneath the spreader and scrapers 80, 81 and 82 to receive excess paste removed from the grids. The conveyor belt 5B deposits the paste it receives upon an inclined chute 275 from which the paste descends into a hopper.

While the embodiment of the present invention as herein disclosed, constitutes a preferred form, it is to be understood that other forms might be adopted, all coming within the scope of the claims which follow.

What is claimed is as follows:

1. A storage battery grid pasting and conveying machine comprising, a grid magazine, pasting appliances, a track along which the grids move horizontally under the pasting appliances, means for feeding grids from the magazine to the track, means for conveying grids along the track, grid transfer means at the delivery end of the track and having provisions for grasping a grid and moving it bodily from a horizontal to a substantially vertical position, means for horizontally conveying grid receiving baskets each having a certain number of spaced grid receiving recesses for holding the grids vertically, means for retracting the grid grasping provisions when a grid receiving recess of a basket is aligned with a grid descending substantially vertically, a ramp upon which each released grid gravitates a short distance sufficient to permit the grid to enter the aligned grid receiving recess of a basket, said ramp having an inclined surface engaged by the lower edge of the grid to cause the grid to gravitate gradually to the bottom of the basket as the basket is moved horizontally, and power driven mechanisms for operating all of said means in timed relation.

2. A machine as defined by claim 1 further characterized in that the grid transfer means includes a pair of aligned, retractible fingers engaging, respectively, opposite side edges of a grid, a moving support which causes the fingers to move the grid from horizontal to substantially vertical position, and cam controlled means for causing the fingers to engage the grid as it leaves the horizontal track and for causing the fingers to release the grid when it is in a substantially vertical position.

3. A machine as defined by claim 1 further characterized in that the grid transfer means includes a shaft which carries a pair of spaced wheels which support pairs of aligned, retractible fingers in equi-angular spaced relation, each pair of fingers engaging, respectively, opposite side edges of a grid, and cam controlled means for causing a pair of fingers to engage the grid as it leaves the horizontal track and for causing the fingers to release the grid when it is in a substantially vertical position.

4. A machine as defined by claim 1 further characterized in that the grid transfer means includes a pair of aligned rods mounted for rotary movement and for horizontal retractible movement, a pair of fingers carried respectively by said pair of rods, said fingers engaging, respectively, opposite side edges of a grid, a support having a circular movement and carrying the rods and causing the fingers to move the grid from a horizontal to a substantially vertical position, cam controlled means for causing the fingers to engage the grid as it leaves the horizontal track and for causing the fingers to release the grid when it is in a substantially vertical position; and cam controlled means for causing the rods to turn slightly to locate the grid vertically at the time of release of the fingers.

5. A machine as defined by claim 1 further characterized in that the grid basket conveying means is driven normally by a constantly operating drive which causes the grid basket to be moved a distance equal to the spacing of the grid receiving recesses of the basket during the time between successive releases of grids from the grid transfer means; and in that the grid basket conveying means is driven periodically by an overdrive which causes said conveying means to carry the filled basket ahead and the next empty basket to be located with its first grid receiving recess under a vertically descending grid during the interval between the filling of the last recess of the filled basket and the filling of the first recess of the next unfilled basket.

6. A machine as defined by claim 1 further characterized in that the grid basket conveying means is driven normally by a constantly operating drive which causes the grid basket to be moved a distance equal to the spacing of the grid receiving recesses of the basket during the time between successive releases of grids from the grid transfer means; and in that the grid basket conveying means is driven periodically by an overdrive which causes said conveying means to carry the filled basket ahead and the next empty basket to be located with its first grid receiving recess under a vertically descending grid during the interval between the filling of the last recess of the filled basket and the filling of the first recess of the next unfilled basket, said overdrive comprising a constantly operating driving member and a driven member normally disconnected therefrom, and means operated by the normal drive of the grid basket conveyor for conditioning said driven member for operation by the overdriving member in response to a certain amount of movement of said normal drive.

7. A machine as defined by claim 1 further characterized in that the grid basket conveying means is driven normally by a constantly operating drive which causes the grid basket to be moved a distance equal to the spacing of the grid receiving recesses of the basket during the time between successive releases of grids from the grid transfer means, and in that the grid basket conveying means is driven periodically by an overdrive which causes said conveying means to carry the filled basket ahead and the next empty basket to be located with its first grid receiving recess under a vertically descending grid during the interval between the filling of the last recess of the filled basket and the filling of the first recess of the next unfilled basket, said overdrive comprising a constantly reciprocating eccentric and rod and oscillating arm operated thereby, a pawl carried by said arm, a disc to be driven by the pawl but normally disconnected from the pawl, said disc having a notch which receives the pawl periodically, and a mechanism operated from the normal drive for the grid basket conveyor for rotating said disc to bring its notch into alignment with the end of said pawl.

8. A machine as defined by claim 1 further characterized as having a chute upon which empty grid baskets are deposited, said baskets gravitating to the bottom of the chute; and means also operated by the power driven mechanism for moving the lowermost basket of the chute to the grid basket conveyor.

9. For use with a storage battery grid pasting machine having a track along which grids are moved horizontally while being pasted and having means for moving the grids along the track, a grid conveying apparatus comprising the combination of a grid transfer means at the delivery end of the track and having provisions for grasping a grid and moving it bodily from a horizontal to a substantially vertical position, means for horizontally conveying grid receiving baskets each having a certain number of spaced grid receiving recesses for holding the grids vertically, means for retracting the grid grasping provisions when a grid receiving recess of a basket is aligned with a grid descending substantially vertically, a ramp upon which each released grid gravitates a short distance sufficient to permit the grid to enter the aligned grid receiving recess of a basket, said ramp having an inclined surface engaged by the lower edge of the grid to cause the grid to gravitate gradually to the bottom of the basket as the basket is moved horizontally, and power driven mechanisms for operating all of said means in timed relation.

10. A machine as defined by claim 9 further characterized in that the grid transfer means includes a pair of aligned, retractible fingers engaging, respectively, opposite side edges of a grid, a moving support which causes the fingers to move the grid from horizontal to substantially vertical position, and cam controlled means for causing the fingers to engage the grid as it leaves the horizontal track and for causing the fingers to release the grid when it is in a substantially vertical position.

11. A machine as defined by claim 9 further characterized in that the grid transfer means includes a shaft which carries a pair of spaced wheels which support pairs of aligned, retractile fingers in equi-angular spaced relation, each pair of fingers engaging, respectively, opposite side edges of a grid, and cam controlled means for causing a pair of fingers to engage the grid as it leaves the horizontal track and for causing the fingers to release the grid when it is in a substantially vertical position.

12. A machine as defined by claim 9 further characterized in that the grid transfer means includes a pair of aligned rods mounted for rotary movement and for horizontal retractile movement, a pair of fingers carried respectively by said pair of rods, said fingers engaging, respectively, opposite side edges of a grid, a support having a circular movement and carrying the rods and causing the fingers to move the grid from a horizontal to a substantially vertical position, cam controlled means for causing the fingers to engage the grid as it leaves the horizontal track and for causing the fingers to release the grid when it is in a substantially vertical position, and cam controlled means for causing the rods to turn slightly to locate the grid vertically at the time of release of the fingers.

13. A machine as defined by claim 9 further characterized in that the grid basket conveying means is driven normally by a constantly operating drive which causes the grid basket to be moved a distance equal to the spacing of the grid receiving recesses of the basket during the time between successive releases of grids from the grid transfer means, and in that the grid basket conveying means is driven periodically by an overdrive which causes said conveying means to carry the filled basket ahead and the next empty basket to be located with its first grid receiving recess under a vertically descending grid during the interval between the filling of the last recess of the filled basket and the filling of the first recess of the next unfilled basket.

14. A machine as defined by claim 9 further characterized in that the grid basket conveying means is driven normally by a constantly operating drive which causes the grid basket to be moved a distance equal to the spacing of the grid receiving recesses of the basket during the time between successive releases of grids from the grid transfer means, and in that the grid basket conveying means is driven periodically by an overdrive which causes said conveying means to carry the filled basket ahead and the next empty basket to be located with its first grid receiving recess under a vertically descending grid during the interval between the filling of the last recess of the filled basket and the filling of the first recess of the next unfilled basket, said overdrive comprising a constantly operating driving member and a driven member normally disconnected therefrom, and means operated by the normal drive of the grid basket conveyor for conditioning said driven member for operation by the overdriving member in response to a certain amount of movement of said normal drive.

15. A machine as defined by claim 9 further characterized in that the grid basket conveying means is driven normally by a constantly operating drive which causes the grid basket to be moved a distance equal to the spacing of the grid receiving recesses of the basket during the time between successive releases of grids from the grid transfer means, and in that the grid basket conveying means is driven periodically by an overdrive which causes said conveying means to carry the filled basket ahead and the next empty basket to be located with its first grid receiving recess under a vertically descending grid during the interval between the filling of the last recess of the filled basket and the filling of the first recess of the next unfilled basket, said overdrive comprising a constantly reciprocating eccentric and rod and oscillating arm operated thereby, a pawl carried by said arm, a disc to be driven by the pawl but normally disconnected from the pawl, said disc having a notch which receives the pawl periodically, and a mechanism operated from the normal drive for the grid basket conveyor for rotating said disc to bring its notch into alignment with the end of said pawl.

16. A machine as defined by claim 9 further characterized as having a chute upon which empty grid baskets are deposited, said baskets gravitating to the bottom of the chute; and means also operated by the power driven mechanism for moving the lowermost basket of the chute to the grid basket conveyor.

17. For use with a storage battery grid pasting machine having a track along which grids are moved horizontally while being pasted and having means for moving the grids along the track, a grid conveying apparatus comprising the combination of a horizontally movable grid supporting device providing recesses for receiving grids and for holding the grids in a position more nearly vertical, a grid transfer means at the delivery end of the track and having provisions for grasping a grid and for moving it bodily from a horizontal position to a position more nearly vertical, means for retracting the grid grasping provisions when a grid receiving recess of the device is aligned with a grid descending somewhat vertically to permit the grid to gravitate into the recess of the device, and a ramp upon which each released grid gravitates a short distance sufficient to permit the grid to enter the aligned grid receiving recess of the device, said ramp having an inclined surface engaged by the lower edge of the grid to cause the grid to gravitate gradually to the bottom of the grid receiving recess as the device moves horizontally.

18. For use with a storage battery grid pasting machine having a track along which grids are moved horizontally while being pasted and having means for moving the grids along the track, a grid conveying apparatus comprising the combination of a horizontally movable grid supporting device providing recesses for receiving grids and for holding the grids in a position more nearly vertical, a grid transfer means at the delivery end of the track and having provisions for grasping a grid and for moving it bodily from a horizontal position to a position more nearly vertical, said grid transfer means including a shaft which carries a pair of spaced wheels which support pairs of aligned, retractible fingers in equi-angular spaced relation, each pair of fingers engaging, respectively, opposite side edges of a grid, and cam controlled means for causing a pair of fingers to engage the grid as it leaves the horizontal track; and means for retracting the fingers from the grid, said means being effective when a grid receiving recess of the device is aligned with a grid descending somewhat vertically to permit the grid to gravitate into the recess of the device.

19. For use with a storage battery grid pasting machine having a track along which grids are moved horizontally while being pasted and having means for moving the grids along the track, a grid conveying apparatus comprising the combination of a horizontally movable grid supporting device providing recesses for receiving grids and for holding the grids in a position more nearly vertical, a grid transfer means at the delivery end of the track and having provisions for grasping a grid and for moving it bodily from a horizontal position to a position more nearly vertical, said grid transfer means including a pair of aligned rods mounted for rotary movement and for horizontal retractible movement, a pair of fingers carried respectively by said pair of rods, said fingers engaging, respectively, opposite side edges of a grid, a support having a circular movement and carrying the rods and causing the fingers to move the grid from a horizontal to a substantially vertical position, cam controlled means for causing the fingers to engage the grid as it leaves the horizontal track, means for retracting the fingers from the grid, said means being effective when a grid receiving recess of the device is aligned with a grid descending somewhat vertically to permit the grid to gravitate into the recess of the device, and cam controlled means for causing the rods to turn slightly to locate the grid vertically at the time of release of the fingers.

EVERETT W. BEEKMAN.
CHAS. W. JONES.